United States Patent Office 2,808,381
Patented Oct. 1, 1957

2,808,381

RESIN-DEXTRIN COMPOSITIONS AND METHOD OF PREPARATION

Raymond A. Stone, Chicago, Ill., assignor to Paisley Products, Inc., Chicago, Ill., a corporation of New York No Drawing. Application August 9, 1955, Serial No. 527,409

19 Claims. (Cl. 260—17.4)

The invention relates to compositions comprising a resinous polymer and dextrin. More particularly the invention relates to compositions comprising dextrin and a polymer such as polyvinyl acetate and copolymers of vinyl acetate, such compositions being suitable for textile sizings, paper coatings and especially as remoistening adhesives. The invention includes the aqueous polymer emulsion in combination with dextrin, the method of preparing the emulsion and articles coated with the adhesive composition.

Remoistening adhesives for sealing envelopes are ordinarily made from dextrin. However, dextrin remoistening adhesives have the following disadvantages:

1. They cause the envelope flap to curl. This makes it difficult to seal the envelopes on automatic sealing equipment.
2. They do not hold properly when used on high rag content bond paper.
3. Dextrin remoistening adhesives are ordinarily very hygroscopic. Consequently the envelope flaps will block if the envelopes are stored at relative humidities of 70% or higher.
4. They are slow setting. As a result, particularly in the case of bulkily packed envelopes, the flaps have a tendency to reopen before the adhesive sets.

The possibility of using as a remoistening adhesive, a water soluble resin such as polyvinyl alcohol together with a polyvinyl acetate emulsion has long been recognized. Envelope remoistening adhesives made with combinations of polyvinyl alcohol and polyvinyl acetate have none of the disadvantages of the dextrin type adhesives. Properly compounded, they resist blocking at 90% relative humidity, they do not cause the envelopes to curl, and they seal securely even when used on high rag content bond papers. However, while dextrin adhesives deposit films which have a very pleasing glossy appearance, the resin type remoistening adhesives deposit a dull, unattractive film. In addition, due to the high cost of polyvinyl alcohol, remoistening adhesives made from mixtures of polyvinyl alcohol and polyvinyl acetate are far more expensive than dextrin adhesives.

I have found that stable mixtures of an aqueous emulsion of polyvinyl acetate and dextrin have all of the advantages of mixtures of polyvinyl alcohol and polyvinyl acetate. They deposit films which are relatively non-hygroscopic, do not curl and when remoistened hold quickly and securely to all types of envelope paper. Furthermore, they are relatively inexpensive and they have a very pleasing glossy appearance.

Heretofore, it has been considered impossible to form stable mixtures of dextrin and a polyvinyl acetate emulsion since it was believed there was an inherent incompatibility between dextrin which is hydrophilic and polyvinyl acetate which is hydrophobic. I have found, on the contrary, that no such inherent incompatibility exists between dextrin and polyvinyl acetate but rather that the difficulty in making stable mixtures of polyvinyl acetate emulsions and dextrin was due to the incompatibility between dextrin and the emulsifying agents employed to form the commonly used polyvinyl acetate emulsions. When, for example, dextrin is added to polyvinyl acetate emulsions having partially saponified polyvinyl acetate, polyvinyl alcohol or methylcellulose as emulsifying agents, the mixtures separate and/or gel on standing due to the fact that dextrin is incompatible with partially saponified polyvinyl acetate, polyvinyl alcohol, or methyl cellulose. Furthermore, mixtures of these polyvinyl acetate emulsions and dextrin deposit dull, unattractive films which do not remoisten and hence are unsatisfactory as remoistening adhesives.

I have found that polyvinyl acetate emulsions can be combined with dextrin to form stable, non-gelling, non-separating mixtures provided the emulsifying agent used to from the polyvinyl acetate emulsion is compatible with dextrin. That is, if a given emulsifying agent when combined with dextrin in aqueous solution does not gel or separate on standing, the polyvinyl acetate emulsion utilizing this emulsifying agent can likewise be combined with dextrin to form stable, non-gelling mixtures. Furthermore, mixtures of these polyvinyl acetate emulsions and dextrin deposit glossy, non-curling, non-hygroscopic films, and are ideally suited as remoistening adhesives.

Dextrin compatible hydrophilic colloids are particularly useful as emulsifying agents in making dextrin compatible polyvinyl acetate emulsions. For example, the copolymer of styrene and maleic anhydride or the copolymer of vinyl methyl ether and maleic anhydride, or polyacrylic acid or the sodium salt of sulphonated polystyrene or polyacrylamide combined in aqueous solution with dextrin does not gel or separate on standing and emulsion polymerized polyvinyl acetate emulsions utilizing the copolymer of styrene and maleic anhydride or the copolymer of vinyl methyl ether and maleic anhydride or polyacrylic acid or the sodium salt of sulphonated polystyrene or polyacrylamide as the emulsifying agent are likewise compatible with dextrin, and mixtures of these emulsions with dextrin are highly satisfactory remoistening adhesives.

By a remoistening adhesive is meant one which is capable of forming a film on a base surface, such as paper and the like, and which when rewet with water and placed in contact with a second uncoated surface will upon drying adhere the base sheet to the second surface so as to require a substantial pull to separate them.

In order to be remoistenable, it is necessary that the adhesive deposit a film which when wet with water redisperses to re-form an emulsion of a type similar to the one from which the film was originally deposited. Polyvinyl acetate emulsions by themselves deposit films which do not remoisten since they are not re-emulsifiable. However, compositions comprising combinations of dextrin and polyvinyl acetate emulsions having a dextrin compatible hydrophilic colloid as the emulsifying agent have excellent remoistening properties. This is believed due to the fact that the dextrin acts as a co-emulsifying agent for the polyvinyl acetate. Hence, when the dried film is wet with water, the dextrin and hydrophilic colloid, since they are mutually compatible, both redissolve and together act to re-emulsify the polyvinyl acetate. However, if the emulsifying agent is not compatible with dextrin, when the film is wet with water, the emulsifying agent does not redissolve along with the dextrin and the polyvinyl acetate is consequently not re-emulsified. The composition, therefore, has only inferior or no remoistening properties.

Particularly satisfactory dextrin compatible polyvinyl acetate emulsifying agents are hydrophilic colloids selected from groups consisting of polymerized carboxylic acids and their alkali metal salts and their anhydrides, polymerized carboxylic amides, copolymers of a polymerizable monoethylenically unsaturated compound and a copolymerizable compound selected from the group consisting of monoethylenically unsaturated carboxylic acids, their alkali metal salts and their anhydrides; and sulphonated polymers of and/or alkali metal salts of sulphonated polymers of alkenyl aromatic compounds having the general formula

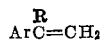

in which Ar is a monovalent aromatic radical and R is hydrogen or the methyl radical. These hydrophilic colloids may be used alone or mixed with each other.

It is preferable that the polymer or copolymer being used as the emulsifying agent be soluble in water at a pH of 6. In addition to being soluble at a pH of 6 it may be soluble at any other pH. The reason that the emulsifying agent preferably should be soluble on the acid side is that it is extremely difficult to make an emulsion polymer of polyvinyl acetate in an alkaline medium. Furthermore, even if such an emulsion could be made, due to the fact that the polyvinyl acetate hydrolyzes in the presence of water, the pH of such an emulsion polymer of polyvinyl acetate would rapidly drift to the acid side. Consequently, if the emulsifying agent is not soluble at a pH of 6, it could be precipitated by the acid formed by the hydrolysis of the polyvinyl acetate and the emulsion would coagulate.

Suitable polymers of carboxylic acids, their anhydrides, and/or their alkali metal salts and polymerized polycarboxylic amides are for example polyacrylic acid, polymethacrylic acid, the lithium, potassium and ammonium salts of polymethacrylic acid, and cesium and sodium salts of polyacrylic acid, the homopolymer of acrylic acid anhydride, polyitaconic acid, polymesaconic acid, polyfumaric acid, polymaleic acid, polycitraconic acid, polyacrylamide, polymethacrylamide and the like.

Suitable copolymerizable mono carboxylic acids are for example acrylic acid, methacrylic acid and crotonic acid.

Suitable copolymerizable monoethylenically unsaturated dicarboxylic acids and anhydrides of monoethylenically unsaturated dicarboxylic acids are for example maleic acid, maleic anhydride, chloro maleic acid, phenyl maleic acid, benzyl maleic acid, fumaric acid, citraconic acid, itaconic acid, itaconic anhydride, methylene-malonic acid, mesaconic acid and the like.

Suitable polymers of polymerizable monoethylenically unsaturated compounds, i. e. polymerizable compounds containing a single

group are for example the copolymers of vinyl acetate and crotonic acid, the potassium salt of the copolymer of vinyl acetate and crotonic acid, the copolymer of methyl methacrylate and acrylic acid, the copolymer of vinyl propionate and methacrylic acid, the copolymer of vinyl acetate and acrylic acid, the ammonium salt of the copolymer of ethyl acrylate and crotonic acid and the like.

Suitable copolymers of unsaturated dicarboxylic acids, their anhydrides and/or their alkali metal salts with a polymerizable compound having a single

group are the copolymer of styrene and maleic anhydride, the copolymer of methyl styrene and maleic anhydride, the copolymer of vinyl methyl ether and maleic anhydride, the copolymer of vinyl ethyl ether and maleic anhydride, the copolymer of parahydroxy styrene and citraconic anhydride, the copolymer of vinyl toluene and mesaconic acid, the copolymer of vinyl xylene and fumaric acid, the ammonium salt of the copolymer of vinyl propyl ether and maleic anhydride, the copolymer of styrene and methylene malonic acid and the like.

It is understood, of course, that polycarboxylic acid anhydrides and copolymers of polymerizable monoethylenically unsaturated compounds with copolymerizable unsaturated dicarboxylic acid anhydrides are converted into the corresponding polymeric carboxylic acids when they are dissolved in water or an aqueous medium. Thus claims which use the terms "polymeric carboxylic acid" and "copolymer of a polymerizable monoethylenically unsaturated compound with a monoethylenically unsaturated carboxylic acid" include compounds which were initially formed with the anhydride as well as with the acid.

Suitable sulphonated polymers of alkenyl aromatic compounds having a general formula

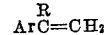

in which Ar is a monovalent aromatic radical and R is hydrogen or the methyl radical are for example the sulphonated homopolymers of styrene alpha methyl styrene, vinyl toluene, vinylxylene, ethyl vinyl benzene and the like, and the sulphonated copolymer of styrene and vinyl chloride.

The mole ratio of copolymerizable carboxylic acid to the polymerizable compound having a single

group necessary to obtain water solubility at a pH of 6 will obviously vary with the respective monomers. However, in general, in order to obtain water solubility at a pH of 6 it is advisable to use in the neighborhood of 40%–50% carboxyl containing monomer to 60%–50% polymerizable monomer having a single

group.

Higher than the minimum ratio of carboxyl containing monomer necessary to obtain water solubility at a pH of 6 can also be used. In fact, there appears to be no upper limit except that non-homopolymerizable carboxyl containing monomers will not copolymerize with a polymerizable monomer having a single

group beyond the ratio of 1:1. The copolymers of unsaturated dicarboxylic acids with a polymerizable compound having a single

group can be made in accordance with the teaching of Arthur Voss et al., United States Patent 2,047,398. The copolymers of unsaturated monocarboxylic acids with polymerizable compounds having a single

group can be suitably prepared by similar methods.

Whether or not the sulphonated polymers of alkenyl aromatic compounds are soluble in water at a pH of 6 depends upon the number of sulphonic acid radicals present per aromatic radical of the resin, and on the nature of the alkenyl aromatic compound. However, in general, in order to be soluble in water at a pH of 6 the sulphonated polymers of alkenyl aromatic compounds having the general formula

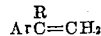

wherein Ar is a monovalent aromatic radical and R is hydrogen or the methyl radical should contain in the neighborhood of between 0.5 and 0.6 mole of sulphonic acid radical per aromatic radical of the resin. The sulphonated polymers of alkenyl aromatic compounds can be prepared in accordance with the teaching of United States Patents Nos. 2,533,210 and 2,533,211.

In making emulsion polymers using these resins as emulsifying agents or protective colloids 2% to 5% emulsifying agent is ordinarily sufficient to obtain emulsions of satisfactory stability. In addition to the emulsifying agent it is often advantageous to use a small amount, between 0.2%–1.0% of surface active agent which serves to further improve the stability of the emulsion. A wide variety of surface active agents have been found suitable such as dioctyl sodium sulfosuccinate, sorbitan polyethylene glycol monostearate, hexyl benzene sodium sulphonate, sodium lauryl sulfate and the like.

Any catalyst useful for polymerizing vinyl acetate can be used in making my dextrin compatible vinyl acetate polymer emulsions, such as ammonium persulfate, potassium persulfate, sodium perborate, peracetic acid and hydrogen peroxide. It is also advisable to use a vinyl acetate polymerization accelerator with the catalyst, such as sodium bisulfite, ferrous sulfate, zinc-formaldehyde sulfoxylate complex, or sodium hydrosulfite.

I preferably use emulsion polymerized polyvinyl acetate emulsions, i. e. polyvinyl acetate emulsions which are made in situ by emulsifying monomeric vinyl acetate in an aqueous solution of an emulsifying agent and subsequently polymerizing the emulsion of vinyl acetate by means of heat and catalysts to form an emulsion of polyvinyl acetate. These emulsions can be made either by forming the monomeric vinyl acetate emulsion at the desired solid content and then polymerizing the vinyl acetate with heat and catalysts or preferably by adding the monomeric vinyl acetate and catalysts to the preheated aqueous solution of protective colloid over a period of time, the rate of addition of monomer and catalysts being so regulated that only a relatively small amount of unreacted monomer exists in the emulsion at any one time. This latter "delayed addition" method is preferred since it results in emulsions of smaller particle size which have correspondingly better stability and which in combination with dextrin deposit films of superior gloss.

The following examples illustrate emulsions made in accordance with this invention. All "parts" are by weight.

Example I

| | Parts |
|---|---|
| Water | 42 |
| Polyacrylic acid | 2 |
| Sodium hydroxide | 0.4 |
| Vinyl acetate monomer | 54 |
| 6% ammonium persulfate solution | 6 |
| 5% sodium bisulfite solution | 3 |

*Procedure.*—The aqueous solution of polyacrylic acid was adjusted with the sodium hydroxide to a pH of 5.5 and charged to a reaction vessel fitted with a reflux condenser and suitable stirrer. The temperature was raised to 80° C. The vinyl acetate, catalyst and accelerator solutions were gradually added to the polyacrylic acid solution the rate being so adjusted to maintain a moderate reflux and a reaction temperature of between 78° C. and 82° C. By the end of 2½ hours all of the vinyl acetate had been added. Heating was continued an additional three-quarters of an hour to polymerize the last traces of unreacted monomer. The emulsion was then cooled to room temperature.

Example II

| | Parts |
|---|---|
| Water | 42 |
| Polyacrylamide | 3.2 |
| Sodium hydroxide | 0.2 |
| Vinyl acetate monomer | 54 |
| 6% ammonium persulfate solution | 7 |
| 5% sodium bisulfite | 3.5 |

*Procedure.*—Same as Example I except that the pH of the aqueous solution was adjusted to 6.0.

Example III

| | Parts |
|---|---|
| Water | 46 |
| Polymethacrylamide | 5 |
| Sodium hydroxide | 0.2 |
| Vinyl acetate monomer | 54 |
| 6% aqueous solution ammonium persulfate | 6 |
| 5% aqueous solution of sodium bisulfite | 3 |

*Procedure.*—Same as in Example II.

Example IV

| | Parts |
|---|---|
| Water | 46 |
| Copolymer of vinyl ethyl ether and maleic anhydride (1:1 molar ratio) | 5 |
| Ammonium hydroxide | 1 |
| Dioctyl sodium sulfosuccinate | 0.5 |
| Vinyl acetate monomer | 54 |
| 6% aqueous solution of ammonium persulfate | 6 |
| 5% aqueous solution of sodium bisulfite | 3 |

*Procedure.*—Same as in Example I.

Example V

| | Parts |
|---|---|
| Water | 44 |
| Copolymer of vinyl methyl ether and maleic anhydride (60:40 molar ratio of vinyl methyl ether to maleic anhydride) | 4 |
| Sodium hydroxide | 0.8 |
| Sorbitan polyethylene glycol monostearate | 0.5 |
| Vinyl acetate monomer | 54 |
| 6% aqueous solution of ammonium persulfate | 7 |
| 5% aqueous solution of sodium bisulfite | 3.5 |

*Procedure.*—Same as Example I.

Example VI

| | Parts |
|---|---|
| Water | 42 |
| Copolymer of styrene and maleic anhydride (1:1 molar ratio) | 3.0 |
| Sodium hydroxide | 0.6 |
| Nonaethylene glycol monostearate | 0.5 |
| Vinyl acetate monomer | 54.0 |
| 6% aqueous solution of ammonium persulfate | 8.0 |
| 5% aqueous solution of sodium bisulfite | 4.0 |

*Procedure.*—Same as in Example I.

Example VII

| | Parts |
|---|---|
| Water | 42 |
| Polymerized acrylic acid anhydride | 3 |
| Vinyl acetate monomer | 54 |
| 6% aqueous ammonium persulfate solution | 6 |
| 5% aqueous sodium bisulfite solution | 3 |

*Procedure.*—Same as Example I except that the polymerization was conducted at a pH of 2.

Example VIII

| | Parts |
|---|---|
| Water | 42 |
| Copolymer of vinyl acetate and acrylic acid (60:40 molar ratio of vinyl acetate to acrylic acid) | 4 |
| Sodium hydroxide | 0.8 |
| Dioctyl sodium sulfosuccinate | 0.5 |
| Vinyl acetate monomer | 54 |
| 6% aqueous solution of ammonium persulfate | 6 |
| 5% aqueous solution of sodium bisulfite | 3 |

*Procedure.*—Same as in Example I.

Example IX

| | Parts |
|---|---|
| Water | 42 |
| Polyitaconic acid | 4 |
| Cesium hydroxide | 0.8 |
| Sorbitan polyethylene glycol monostearate | 0.7 |
| Vinyl acetate monomer | 54 |
| 6% aqueous solution of ammonium persulfate | 6 |
| 5% aqueous solution of sodium bisulfite | 3 |

*Procedure.*—Same as Example I.

Example X

| | Parts |
|---|---|
| Water | 42 |
| Copolymer of methyl acrylate and acrylic acid (1:1 mole ratio of methyl acrylate to acrylic acid) | 3 |
| Sorbitan poyethylene glycol monostearate | 0.6 |
| Vinyl acetate monomer | 54 |
| 6% aqueous solution of ammonium persulfate | 6 |
| 5% aqueous solution of sodium bisulfite | 3 |

*Procedure.*—Same as Example I except the polymerization was conducted at a pH of 2.

Example XI

| | Parts |
|---|---|
| Water | 42 |
| Polycitraconic acid | 4 |
| Potassium hydroxide | 0.5 |
| Dioctyl sodium sulfosuccinate | 0.5 |
| Vinyl acetate monomer | 54 |
| 6% aqueous solution of ammonium persulfate | 6 |
| 5% aqueous solution of sodium bisulfite | 3 |

*Procedure.*—Same as in Example I.

Example XII

| | Parts |
|---|---|
| Water | 42 |
| Copolymer of vinyl methyl ether and maleic anhydride (1:1 molar ratio of vinyl methyl ether to maleic anhydride) | 3 |
| Dioctyl sodium sulfosuccinate | 0.5 |
| Vinyl acetate monomer | 54 |
| 6% aqueous solution of ammonium persulfate | 6 |
| 5% aqueous solution of sodium bifulfite | 5 |

*Procedure.*—Same as in Example I except that polymerization was conducted at a pH of 2.

Example XIII

| | Parts |
|---|---|
| Water | 44 |
| Polyacrylic acid | 5 |
| Sorbitan polyethylglycol monostearate | 0.5 |
| Vinyl acetate monomer | 54 |
| 6% aqueous solution of ammonium persulfate | 6 |
| 5% aqueous solution of sodium bisulfite | 3 |

*Procedure.*—Same as in Example I except that polymerization was conducted at a pH of 2.

Example XIV

| | Parts |
|---|---|
| Water | 44 |
| Copolymer of ethyl methacrylate and acrylic acid (1:1 molar ratio polyethyleneglycol monostearate) | 0.5 |
| Vinyl acetate monomer | 54 |
| 6% aqueous solution of ammonium persulfate | 6 |
| 5% aqueous solution of sodium bisulfite | 3 |

*Procedure.*—Same as in Example I except that polymerization was conducted at a pH of 2.

Example XV

| | Parts |
|---|---|
| Water | 44 |
| Copolymer of vinyl acetate and methacrylic acid (1:1 molar ratio of vinyl acetate to methacrylic acid) | 4 |
| Hexylbenzene sodium sulphonate | 0.5 |
| Vinyl acetate monomer | 54 |
| 6% aqueous solution of ammonium persulfate | 8 |
| 6% aqueous solution of sodium bisulfite | 4 |

*Procedure.*—Same as in Example I except that polymerization was conducted at a pH of 2.

Example XVI

| | Parts |
|---|---|
| Water | 42 |
| Copolymer of parahydroxy styrene and citraconic anhydride (1:1 molar ratio) | 4 |
| Sorbitan polyethylene glycol monostearate | 0.7 |
| Ammonium hydroxide | 0.8 |
| Vinyl acetate monomer | 54 |
| 6% aqueous solution of ammonium persulfate | 7 |
| 5% aqueous solution of sodium bisulfite | 3.5 |

*Procedure.*—Same as in Example II.

Example XVII

| | Parts |
|---|---|
| Water | 42 |
| Copolymer of vinylmethylether and chloromaleic acid | 5 |
| Dioctyl sodium sulfosuccinate | 0.5 |
| Sodium hydroxide | 1 |
| Vinyl acetate monomer | 54 |
| 6% aqueous solution of ammonium persulfate | 5 |
| 5% aqueous solution of sodium bisulfite | 2.5 |

*Procedure.*—Same as in Example I.

Example XVIII

| | Parts |
|---|---|
| Water | 42 |
| Sodium salt of sulphonated polystyrene (0.6 sulphonic radicals per aromatic radical) | 3 |
| Sorbitan polyethylene glycol monostearate | 0.5 |
| Vinyl acetate monomer | 54 |
| 6% aqueous solution of ammonium persulfate | 8 |
| 5% aqueous solution of sodium bisulfite | 4 |

*Procedure.*—Same as in Example I except that polymerization was conducted at a pH of 7.

Example XIX

| | Parts |
|---|---|
| Water | 42 |
| Ammonium salt of sulphonated polyvinyl toluene (1.0 sulphonic acid radical per aromatic radical) | 3 |
| Hexylbenzene sodium sulphonate | 0.5 |
| Vinyl acetate monomer | 54 |
| 6% aqueous solution of ammonium persulfate | 8 |
| 5% aqueous solution of sodium bisulfite | 4 |

*Procedure.*—Same as in Example XVIII.

Example XX

| | Parts |
|---|---|
| Water | 42 |
| Rubidium salt of sulphonated alpha methyl styrene (0.8 sulphonic acid radicals per aromatic radical) | 3 |
| Sorbitan polyethyleneglycol monostearate | 0.5 |
| Vinyl acetate monomer | 54 |
| 6% aqueous solution of ammonium persulfate | 8 |
| 5% aqueous solution of sodium bisulfite | 4 |

*Procedure.*—Same as in Example XVIII.

All of the above emulsions when combined with dextrin formed stable, non-separating, non-gelling mixtures.

While for most purposes of this invention it is preferred to combine an emulsion of a homopolymer of vinyl acetate and dextrin, particularly because of the relatively low cost of polyvinyl acetate, for remoistening adhesive or for other purposes it may be advantageous to utilize a mixture of an emulsion of a copolymer of vinyl acetate and dextrin. Mixtures of emulsions of copolymers of vinyl acetate and dextrin deposit films which are considerably more flexible than films from the corresponding mixtures of the emulsions of a homopolymer of vinyl acetate and dextrin. This is of distinct advantage, for example, in grease proof paper coatings. I have found that emulsions of copolymers of vinyl acetate utilizing the same above described protective colloids are likewise completely compatible with dextrin. Suitable copolymers of vinyl acetate are the copolymers of vinyl acetate with esters of copolymerizable monoethylenically unsaturated dicarboxylic acids such as dibutyl maleate, diethyl fumarate, dioctyl maleate and the like; copolymers of vinyl acetate with other vinyl esters such as vinyl propionate, vinyl butyrate, vinyl hexoate, vinyl benzoate and the like; copolymers of vinyl aceate with vinyl halides such as vinyl chloride and vinyl bromide; copolymers of vinyl acetate with lower alkyl esters of acrylic acid such as methyl acrylate, propyl acrylate, butyl acrylate, hexyl acrylate, octyl acrylate and the like; copolymers of vinyl acetate with lower alkyl esters of methacrylic acid such as methyl methacrylate, ethyl methacrylate, propyl methacrylate, butyl methacrylate, hexyl methacrylate, octyl methacrylate and the like; copolymers of vinyl acetate with monoethylenically unsaturated carboxylic acids such as acrylic acid, methacrylic acid, crotonic acid and the like, etc. In general the copolymer of vinyl acetate should contain more than 50% vinyl acetate and for most purposes the ratio of vinyl acetate to comonomer should be in the range of between 8–1 and 4–1.

The following examples illustrate emulsions of copolymers of vinyl acetate made in accordance with this invention.

*Example XXI*

| | Parts |
|---|---|
| Water | 42 |
| Copolymer of vinyl methyl ether and maleic anhydride (1:1 molar ratio) | 5 |
| Sorbitan polyethylene glycol monostearate | 0.5 |
| Sodium hydroxide | 1 |
| Vinyl acetate monomer | 44 |
| Dibutyl fumarate | 10 |
| 6% aqueous solution of ammonium persulfate | 10 |
| 5% aqueous solution of sodium bisulfate | 5 |

*Procedure.*—The aqueous solution of the copolymer of vinyl methyl ether and maleic anhydride was adjusted to a pH of 5.5 and charged to a reaction vessel fitted with a reflux condenser and suitable stirrer. The temperature of the solution was raised to 80° C. The vinyl acetate and dibutyl fumarate were premixed and together with the solutions of catalyst and accelerator were added over a period of 6 hours to the solution of emulsifying agent, the rates of addition of monomers, catalyst and accelerators being adjusted to maintain a moderate reflux and a reaction temperature of between 78° C. and 82° C. Heating was continued an additional three quarters of an hour thereafter to polymerize the last traces of unreacted monomer. The emulsion was then cooled to room temperature.

*Example XXII*

| | Parts |
|---|---|
| Water | 42 |
| Sodium salt of sulphonated polystyrene (0.55 sulphonic acid radicals per aromatic radical) | 3 |
| Nonaethylene glycol monostearate | 0.7 |
| Vinyl acetate monomer | 40 |
| Ethyl acrylate | 14 |
| 6% aqueous solution of ammonium persulfate | 9 |
| 5% aqueous solution of sodium bisulfite | 4.5 |

*Procedure.*—Same as Example XXI except that polymerization was conducted at a pH of 7.

*Example XXIII*

| | Parts |
|---|---|
| Water | 42 |
| Polyacrylic acid | 4 |
| Sorbitan polyethylene glycol monostearate | 0.7 |
| Ammonium hydroxide | 0.8 |
| Vinyl acetate monomer | 48 |
| Vinyl ethyl butyrate | 6 |

*Procedure.*—Same as in Example XXI.

*Example XXIV*

| | Parts |
|---|---|
| Water | 42 |
| Copolymer of vinyl acetate and acrylic acid (1:1 molar ratio of vinyl acetate to acrylic acid) | 3 |
| Hexyl benzene sodium sulphonate | 0.6 |
| Potassium hydroxide | 0.6 |
| Vinyl acetate monomer | 50 |
| Dibutyl maleate | 4 |
| 6% aqueous solution of ammonium | 7 |
| 5% aqueous solution of sodium bisulfite | 3.5 |

*Procedure.*—Same as in Example XXI.

All of the above emulsions when combined with dextrin formed stable, non-separating, non-gelling mixtures.

Pure dextrin has the general formula $(C_6H_{10}O_5)n$, and is soluble in hot or cold water, insoluble in alcohol or ether, dextrorotatary, non- or only slight copper reducing, almost unfermentable and gives either a red color or no color with iodine.

In the industrial sense commercial dextrin commonly denotes the various products obtained by roasting starch alone or with a small quantity of acid or catalyst or by heating an aqueous slurry of starch in the presence of an acid or catalytic enzyme. These products are more or less soluble in cold water and almost completely soluble in hot water and in addition to pure dextrins they contain more or less soluble starch or sugar. Commercial dextrins are classified by the source from which they are made and by the percent of cold water soluble fraction they contain. For example, dextrins can be made from corn, potato, barley, wheat, rye, sago, or arrowroot starch and can be made to contain from about 4% to 100% water soluble fraction.

Dextrins can also be made synthetically by the polymerization of sugar and these synthetic dextrins are commonly known as polysaccharides.

The polyvinyl acetate emulsions of this invention are completely compatible with pure dextrin or with any type of commercial dextrin regardless of its method of manufacture, source or water solubility. The term "dextrin" as used in the examples of this application means commercial dextrin of the type designated.

For the purpose of making a suitable remoistening adhesive, I prefer to use a dextrin which is soluble in cold water to the extent of 95%–100% since adhesives using these highly soluble dextrins deposit films of exceptional gloss.

However, suitable remoistening adhesions can be made using commercial dextrin which contains as low as 40% cold water soluble fraction. Combinations of the polyvinyl acetate emulsions of this invention with commercial dextrin that contain less than 40% cold water soluble fraction deposit films which do not remoisten readily.

Also in order to make adhesives which are readily remoistenable it is necessary to combine a sufficient quantity of dextrin with the polyvinyl acetate emulsion. While this will vary somewhat depending on the solubility of the dextrin, I have found in general that it is necessary to use at least one part of dextrin to 6 parts of polyvinyl acetate on a solids basis to obtain a satisfactory remoistening adhesive. Much larger amounts may also be used. However, if the ratio of dextrin to polyvinyl acetate exceeds 10 parts of dextrin to 1 part of polyvinyl acetate, the combination has only minor advantages over remoistening adhesives containing dextrin alone.

Remoistening adhesives comprising a mixture of polyvinyl acetate emulsion and dextrin deposit films which have far less tendency to curl than films from solutions of dextrin alone. However by the use of a proper plasticizer it is possible to obtain films which are completely non-curling. The plasticizer should preferably be non-toxic, colorless, tasteless, odorless, and water soluble. Examples of suitable plasticizers are:

Glycerine
Sorbitol
2,4,6 hexane triol
Propylene glycol
Triethylene glycol
Tetra ethylene glycol To completely eliminate curl, it is necessary to use at least 3% plasticizer based on the weight of the dextrin. Higher amounts can be used. However, if the ratio of plasticizer to dextrin exceeds 30% of the weight of the dextrin the adhesive dries too slowly.

The following examples illustrate remoistening adhesives containing a combination of dextrin and vinyl acetate polymer emulsions.

In the following examples the dextrin was dissolved in water and the vinyl acetate polymer emulsion was then added with simple stirring.

*Example XXV*

|  | Parts |
|---|---|
| Water | 8 |
| Tapioca dextrin (100% soluble) | 12.5 |
| Polyvinyl acetate emulsion from Example I | 100 |

*Example XXVI*

| Water | 15 |
|---|---|
| Corn dextrin (90% soluble) | 25 |
| Polyvinyl acetate emulsion from Example II | 100 |

*Example XXVII*

| Water | 30 |
|---|---|
| Tapioca dextrin (95% soluble) | 50 |
| Polyvinyl acetate emulsion from Example V | 100 |

*Example XXVIII*

| Water | 4 |
|---|---|
| Potato dextrin (100% soluble) | 12.5 |
| Polyvinyl acetate emulsion from Example VI | 100 |

*Example XXIX*

| Water | 70 |
|---|---|
| Tapioca dextrin (95% soluble) | 100 |
| Polyvinyl acetate emulsion from Example VII | 100 |

*Example XXX*

| Water | 120 |
|---|---|
| Corn dextrin (100% soluble) | 200 |
| Polyvinyl acetate emulsion from Example VIII | 100 |

*Example XXXI*

| Water | 250 |
|---|---|
| Potato dextrin (95% soluble) | 500 |
| Polyvinyl acetate emulsion from Example IX | 100 |

All of the above compositions were stable. Used as remoistening adhesives, they deposited glossy films which were relatively non-curling and non-hygroscopic. They remoistened readily and held rapidly and securely when used on a wide variety of envelope papers.

*Example XXXII*

|  | Parts |
|---|---|
| Water | 12 |
| Sago dextrin (100% soluble) | 25 |
| Polyvinyl acetate emulsion from Example XII | 100 |
| Glycerine | 0.75 |

*Example XXXIII*

| Water | 25 |
|---|---|
| Rye dextrin (95% soluble) | 50 |
| Polyvinyl acetate emulsion from Example XV | 100 |
| Sorbitol | 5 |

*Example XXXIV*

| Water | 100 |
|---|---|
| Tapioca dextrin (100% soluble) | 200 |
| Polyvinyl acetate emulsion from Example XVII | 100 |
| Propylene glycol | 20 |

*Example XXXV*

| Water | 12.5 |
|---|---|
| Corn dextrin (90% soluble) | 25 |
| Polyvinyl acetate copolymer emulsion from Example XXI | 100 |
| Triethylene glycol | 7.5 |

*Example XXXVI*

|  | Parts |
|---|---|
| Water | 100 |
| Tapicoa dextrin (100% soluble) | 100 |
| Polyvinyl acetate coplymer emulsion from Example XXII | 100 |
| Glycerine | 5 |

All of the above compositions were stable. Used as remoistening adhesives they deposited glossy films which were relatively non-hygroscopic and completely non-curling. They remoistened readily and held rapidly and securely when used on a wide variety of envelope papers.

In the following examples, the dextrin was dispersed in the water and the mixture heated to 185° F. to effect solution. The vinyl acetate polymer emulsion was then added with simple stirring.

*Example XXXVII*

|  | Parts |
|---|---|
| Water | 75 |
| Corn dextrin (40% soluble) | 50 |
| Polyvinyl acetate emulsion from Example III | 100 |
| Sorbitol | 5 |

*Example XXXVIII*

|  | Parts |
|---|---|
| Water | 75 |
| Tapioca dextrin (60% soluble) | 75 |
| Polyvinyl acetate emulsion from Example IV | 100 |
| Propylene glycol | 7.5 |

*Example XXXIX*

|  | Parts |
|---|---|
| Water | 250 |
| Potato dextrin (80% soluble) | 300 |
| Polyvinyl acetate emulsion from Example XXV | 100 |
| Tetraethylene glycol | 10 |

All of the above compositions were stable. Used as remoistening adhesives they deposited films which are relatively non-hygroscopic, completely non-curling and which remoistened readily and held rapidly and securely when used on a wide variety of envelope papers. However, they were somewhat less glossy than corresponding compositions containing more highly soluble dextrins.

The composition of this invention beyond their being used as envelope adhesives can obviously also be employed as remoistening adhesives for stamps, wallpaper, labels and the like.

In addition to their use as remoistening adhesives, the combinations of this invention of polyvinyl acetate homopolymer and copolymer emulsions and dextrin can be employed as paper coatings and textile sizings. For example, paper coatings can be made that are non-blocking, flexible, glossy, grease resistant, easily printable and relatively inexpensive. Also, properly formulated mixtures of polyvinyl acetate homopolymer or copolymer emulsions and dextrin when applied to textile fibers impart properties of hand and stiffness more desirable than those obtainable with either dextrin or polyvinyl acetate alone.

In formulating a paper coating or textile sizing comprising a combination of polyvinyl acetate emulsion and dextrin, a wide choice of dextrins can be used. Dextrins of relatively low solubility in the neighborhood of 10%–20% are suitable for making sizings or coatings which are relatively water resistant. On the other hand, a temporary sizing which can be made by combining the polyvinyl acetate emulsions of this invention with dextrins which are between 90% and 100% soluble in water.

The following examples illustrate paper coatings and textile sizings comprising mixtures of dextrin and emulsion polymerized polyvinyl acetate emulsions.

*Example XL*

| | Parts |
|---|---|
| Water | 12.5 |
| Tapioca dextrin (10% soluble) | 50 |
| Polyvinyl acetate copolymer emulsion from Example XXI | 100 |

The dextrin was dispersed in the water and the mixture heated to 185° F. to effect solution. The polyvinyl acetate copolymer emulsion was added with simple stirring. The above composition was diluted to approximately 3% solids. Applied to cotton fabric and dried it imparted a full crisp hand without undue stiffness.

*Example XLI*

| | Parts |
|---|---|
| Water | 100 |
| Corn dextrin (70% soluble) | 75 |
| Polyvinyl acetate emulsion from Example III | 100 |
| Glycerine | 5 |

The corn dextrine was dissolved in hot water. The polyvinyl acetate emulsion and glycerine were then added with simple stirring. The above compositions applied to 20 lb. sulfite paper and dried formed a glossy, nonblocking, flexible, grease resistant coating.

*Example XLII*

| | Parts |
|---|---|
| Water | 100 |
| China clay | 50 |
| Tapioca dextrin (100% soluble) | 100 |
| Polyvinyl acetate copolymer emulsion of Example XXII | 100 |
| Sorbitol | 5 |

The clay was dispersed in the water with rapid agitation. The tapioca dextrin was then added and dissolved followed by the polyvinyl acetate copolymer emulsion and sorbitol. The above composition was applied to 30 lb. bleached sulfite paper and dried over hot calender rolls. It formed a tough, non-blocking, grease resistant coating with excellent ink hold-out properties.

As already pointed out, the formulation of the invention is one consisting essentially of the above described components. But there may be included therewith other materials such as preservatives, fillers, extenders, or the like, as known to those skilled in the art and which do not interfere with the purposes of the invention as set forth in the foregoing description.

It is thus seen that the invention is broad in scope and is not to be restricted excepting by the claims, in which it is my intention to cover all novelty inherent in the invention as broadly as possible in view of the prior art.

I claim:

1. A liquid composition comprising an aqueous emulsion of a polymer selected from the group consisting of homopolymers of vinyl acetate and copolymers of vinyl acetate in which the vinyl acetate is present in major amount, a dextrin compatible hydrophilic colloid as an emulsifying agent for said emulsion and dextrin.

2. The composition of claim 1 wherein the polymer is polyvinyl acetate.

3. The composition of claim 1 wherein the emulsifying agent is hydrophilic colloid soluble in water at a pH of 6.

4. The composition of claim 1 wherein the emulsifying agent is an alkali metal salt of a polymeric carboxylic acid.

5. The composition of claim 1 wherein the emulsifying agent is a polymeric carboxylic amide.

6. The composition of claim 1 wherein the emulsifying agent is a polymeric carboxylic acid.

7. The composition of claim 1 wherein the emulsifying agent is an alkali metal salt of a sulphonated polymer of an alkenyl aromatic compound having the general formula

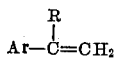

$$\text{Ar}-\underset{\underset{R}{|}}{C}=CH_2$$

in which Ar is a mono valent aromatic radical and R is selected from the group consisting of hydrogen and methyl.

8. The composition of claim 1 wherein the emulsifying agent is an alkali metal salt of a copolymer of a polymerizable monoethylenically unsaturated compound with a monoethylenically unsaturated carboxylic acid.

9. The composition of claim 8 wherein the polymerizable monoethylenically unsaturated compound is vinyl methyl ether.

10. The composition of claim 8 wherein the monoethylenically unsaturated carboxylic acid is maleic acid and the monoethylenically unsaturated compound is vinyl methyl ether.

11. The composition of claim 10 wherein the vinyl acetate containing polymer is polyvinyl acetate.

12. A liquid composition comprising a stable mixture of an aqueous emulsion of a polymer selected from the group consisting of homopolymers of vinyl acetate and copolymers of vinyl acetate in which the vinyl acetate is present in a major amount, a dextrin compatible hydrophilic colloid as an emulsifying agent for said emulsion and dextrin, the ratio of dextrin to said polymer being between approximately 1:6 and 10:1.

13. The composition of claim 12 wherein the polymer is polyvinyl acetate.

14. A water remoistenable adhesive composition comprising a water insoluble polymer selected from the group consisting of homopolymers of vinyl acetate and copolymers of vinyl acetate in which the vinyl acetate is present in major amount, a dextrin compatible hydrophilic colloid as an emulsifying agent therefor and dextrin the ratio of dextrin to said polymer being between approximately 1:6 and 10:1.

15. The composition of claim 14 wherein the emulsifying agent is an alkali metal salt of a copolymer of a polymerizable monoethylenically unsaturated compound with a monoethylenically unsaturated carboxylic acid.

16. The composition of claim 15 wherein the copolymer is a copolymer of vinyl methyl ether with maleic acid.

17. Paper coated with a composition of claim 14.

18. The method of making a liquid coating composition which comprises emulsifying monomeric vinyl acetate in an aqueous solution containing a dextrin compatible hydrophilic colloid as an emulsifying agent, polymerizing the emulsified vinyl acetate and adding dextrin to the emulsion so formed.

19. The method of claim 18 wherein the monomeric vinyl acetate is added at such a rate that only a minor proportion of the total incorporated vinyl acetate exists in the unreacted condition at any one instant of time.

(References on following page)

References Cited in the file of this patent

UNITED STATES PATENTS

| | | |
|---|---|---|
| 2,557,083 | Eberl | June 19, 1951 |
| 2,624,715 | Wildish | Jan. 6, 1953 |
| 2,637,712 | Upton | May 5, 1953 |
| 2,662,866 | Bristol | Dec. 15, 1953 |

OTHER REFERENCES

R & H Technical Bulletin: "Water Emulsions of Polyvinyl Acetate," published by Du Pont, Wilmington, Delaware. Received Nov. 1943.